United States Patent
Nakase et al.

(10) Patent No.: US 8,734,188 B2
(45) Date of Patent: May 27, 2014

(54) TRAY-TYPE CARD CONNECTOR PREVENTING TRAY FROM FLYING OUT THEREFROM

(75) Inventors: Yusho Nakase, Yokohama (JP); Xiao-Dong Hu, Shenzhen (CN); Shi-Jie Tan, Shenzhen (CN); Zhen-Ye Lin, Shenzhen (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 70 days.

(21) Appl. No.: 13/459,091

(22) Filed: Apr. 28, 2012

(65) Prior Publication Data

US 2012/0276765 A1 Nov. 1, 2012

(30) Foreign Application Priority Data

Apr. 29, 2011 (CN) .......................... 2011 1 0110885

(51) Int. Cl.
*H01R 12/00* (2006.01)
(52) U.S. Cl.
USPC ........................................... 439/630; 439/159
(58) Field of Classification Search
USPC ........................................... 439/630, 159, 160
See application file for complete search history.

(56) References Cited

U.S. PATENT DOCUMENTS

| | | | |
|---|---|---|---|
| 5,315,478 A | 5/1994 | Cadwell et al. | |
| 7,568,928 B2 * | 8/2009 | Hou et al. | 439/188 |
| 7,766,678 B1 * | 8/2010 | Abe | 439/159 |
| 7,865,210 B2 * | 1/2011 | Wang et al. | 455/550.1 |
| 8,145,261 B2 | 3/2012 | Wang et al. | |
| 8,292,642 B1 * | 10/2012 | Lee et al. | 439/159 |
| 8,376,764 B1 * | 2/2013 | Su et al. | 439/157 |
| 8,393,909 B1 * | 3/2013 | Lai et al. | 439/159 |
| 8,419,454 B1 * | 4/2013 | Ji et al. | 439/159 |
| 8,419,478 B2 * | 4/2013 | Liu et al. | 439/631 |
| 8,439,696 B2 * | 5/2013 | Zhou et al. | 439/188 |
| 2009/0023319 A1 * | 1/2009 | Hou et al. | 439/159 |
| 2009/0047835 A1 * | 2/2009 | Lin | 439/632 |
| 2009/0267677 A1 | 10/2009 | Myers et al. | |
| 2012/0196462 A1 * | 8/2012 | Henry et al. | 439/159 |
| 2012/0276780 A1 * | 11/2012 | Hu et al. | 439/630 |

FOREIGN PATENT DOCUMENTS

| | | |
|---|---|---|
| CN | 201230057 | 4/2009 |
| CN | 201352650 | 11/2009 |
| TW | M248060 | 10/2004 |

* cited by examiner

*Primary Examiner* — Gary Paumen
(74) *Attorney, Agent, or Firm* — Wei Te Chung; Ming Chieh Chang

(57) ABSTRACT

A card connector (100) includes an insulative housing (10), a number of contacts (30) retained in the insulative housing, a metal shell (20) attached to the insulative housing for cooperatively defining a receiving space (60), and a tray (40) received in the receiving space. The metal shell includes a pair of elastic portions (24). The tray has a frame portion (41) having two lateral edges. Each lateral edge has a notch (410) securing with the corresponding elastic portion when the tray is fully inserted in the receiving space along an insertion/ejection direction and an inclined surface (414) on which the elastic portions bias to slow down ejection of the tray.

16 Claims, 8 Drawing Sheets

TRAY-TYPE CARD CONNECTOR PREVENTING TRAY FROM FLYING OUT THEREFROM

CROSS-REFERENCE TO RELATED APPLICATIONS

This patent application relates to a U.S. patent application Ser. No. 13/459,090, filed on Apr. 28, 2012, entitled "CARD CONNECTOR WITH IMPROVED EJECTOR CAM PORTION" and another U.S. patent application Ser. No. 13/459,089, filed on Apr. 28, 2012, entitled "TRAY-TYPE CARD CONNECTOR WITH DUAL FEELINGS DURING BOTH INSERTION AND EJECTION OF TRAY", both of which are assigned to the same assignee as this application.

BACKGROUND OF THE INVENTION

1. Field of the Invention

The present invention relates generally to a card connector, and more particularly to a tray-type card connector preventing tray from flying out therefrom.

2. Description of Related Arts

U.S. Pat. No. 7,865,210 and US Application Pub. No. 2009/0267677 disclose an electronic device comprising a tray-type card connector having a tray facilitating insertion of a micro SIM card into the card connector. The card connector includes an insulative housing, a plurality of contacts retained in the insulative housing, a metal shell covering the insulative housing cooperatively defining a receiving space, and an ejector assembled at a side of the insulative housing. The electronic device has a pair of retaining elements at two lateral sides of the card connector. Each retaining element forms a locking portion. The tray comprises a cutout securing with the locking portion of the retaining element when the tray is fully inserted in the card connector. However, the tray is easily flied out of the card connector when a user pushes the ejector under a large force.

U.S. Pat. No. 5,315,478 to Cadwell et al. discloses a tray for inserting a memory card into a portable computer, including a stop mechanism that restrains the tray within the computer housing when the tray is opened.

SUMMARY OF THE INVENTION

Accordingly, an object of the present invention is to provide a card connector preventing tray from flying out therefrom.

To achieve the above object, a card connector includes an insulative housing, a number of contacts retained in the insulative housing, a metal shell attached to the insulative housing for cooperatively defining a receiving space, and a tray received in the receiving space. The metal shell includes a pair of elastic portions. The tray has a frame portion having two lateral edges. Each lateral edge has a notch securing with the corresponding elastic portion when the tray is fully inserted in the receiving space along an insertion/ejection direction and an inclined surface on which the elastic portions bias to slow down ejection of the tray.

Other objects, advantages and novel features of the invention will become more apparent from the following detailed description when taken in conjunction with the accompanying drawings.

DETAILED DESCRIPTION OF THE PREFERRED EMBODIMENT

Figure 1:
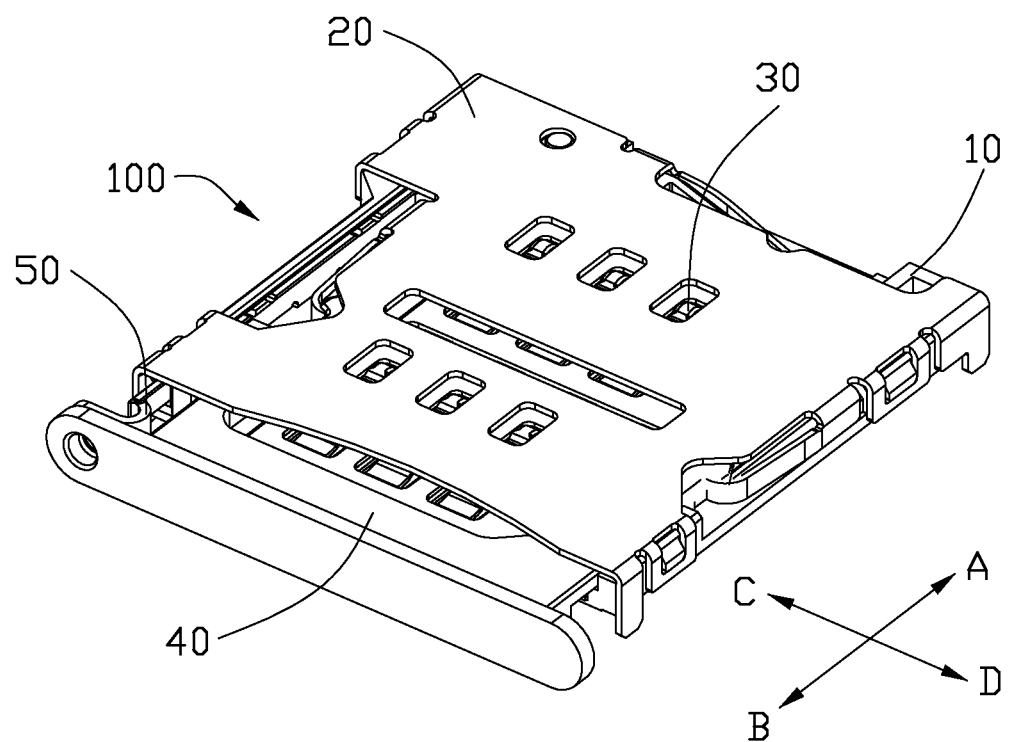
FIG. 1 is a perspective, assembled view of a card connector constructed in accordance with the present invention.

Reference will now be made in detail to the preferred embodiment of the present invention.

Referring to FIGS. 1-8, a tray-type card connector 100 in accordance with the present invention used for receiving an electrical card, includes an insulative housing 10, a metal shell 20 attached to the insulative housing 10 for cooperatively defining a receiving space 60, a plurality of contacts 30 fixed in the insulative housing 10, a tray 40 slidably received in the receiving space 60 along an insertion direction A, and an ejector 50 ejecting the tray 40 from the receiving space 60 along an ejection direction B which is opposite to the insertion direction A. Furthermore, a left direction C and a right direction D are defined when taken a view along the insertion direction A. In accordance with the embodiments of the present disclosure, the card connector 100 is a micro SIM card connector and the electrical card is a micro SIM card, accordingly.

Figure 2:
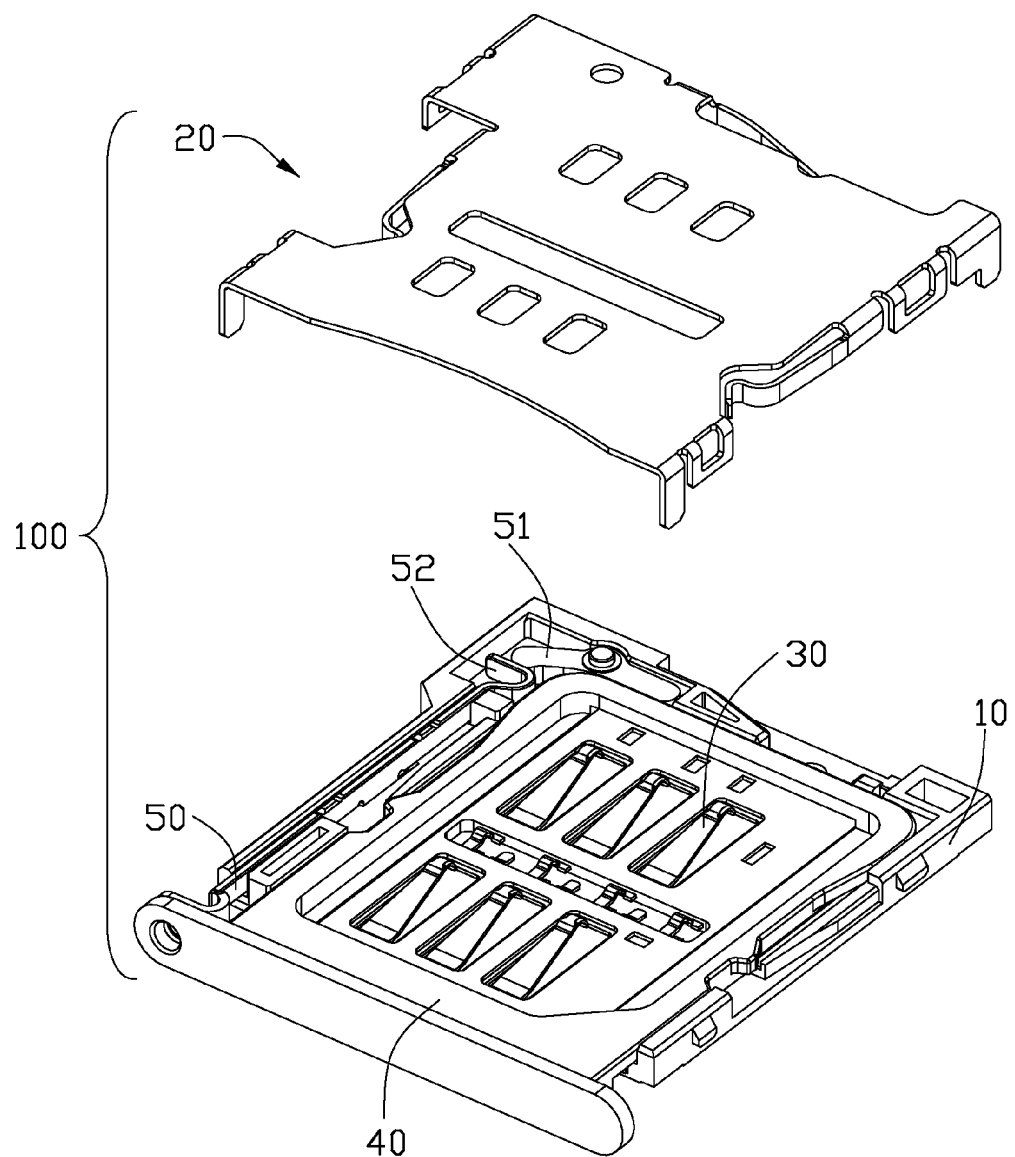
FIG. 2 is a perspective, partly exploded view of the card connector when a metal shell is separated from other parts thereof.

Referring to FIG. 2, the insulative housing 10 comprises a base portion 11, a pair of vertical walls 12, and a rear wall 17 extending upwardly from the base portion 11. The contacts 30 are retained on the base portion 11 with contacting portions (not labeled) thereof extending into the receiving space 60. The right vertical wall 12 forms two protrusions 13 projecting outwardly. Each vertical wall 12 defines an interspace 14 and forms a block portion 15 extending towards the interspace 14. A guiding surface 151 is defined adjacent to the interspace 14. The insulative housing 10 defines a channel 16 for assembling the ejector 50. The channel 16 is positioned beside the left vertical wall 12. The rear wall 17 defines an arc recess 18 facing towards the receiving space 60 and the base portion 11 defines a first hole 19 at frontal of the arc recess 18.

Figure 3:
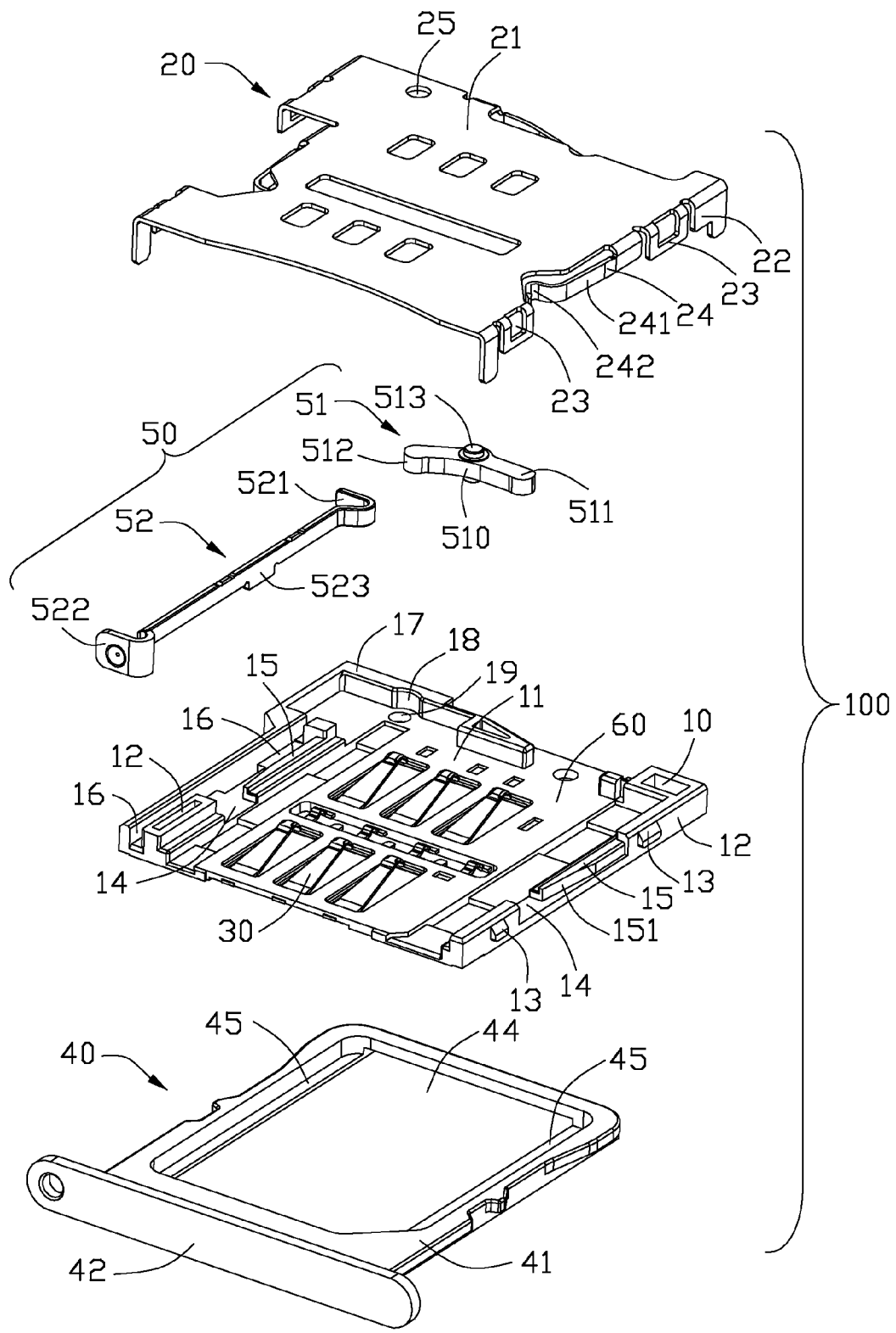
FIG. 3 is a perspective, exploded view of the card connector.

Referring to FIGS. 1-3, the metal shell 20 comprises a main portion 21 and a pair of lateral walls 22 extending downwardly from the main portion 21. The lateral walls 22 define a plurality of apertures 23 receiving the protrusions 13 for securing the metal shell 20 with the insulative housing 10. The metal shell 20 comprises an elastic portion (spring tang) 24 extending forwardly and inwardly into the receiving space 60 through the cutout 14. The elastic portion (spring tang) 24 has a flexible arm 241 extending along the ejection direction B and a securing portion (locking head) 242 curvedly formed at the end of the flexible arm 241. The main portion 21 defines a second hole 25 corresponding to the first hole 19 along a vertical direction perpendicular to both the opposing insertion/ejection directions A and B and the opposing left/right directions C and D.

Figure 4:
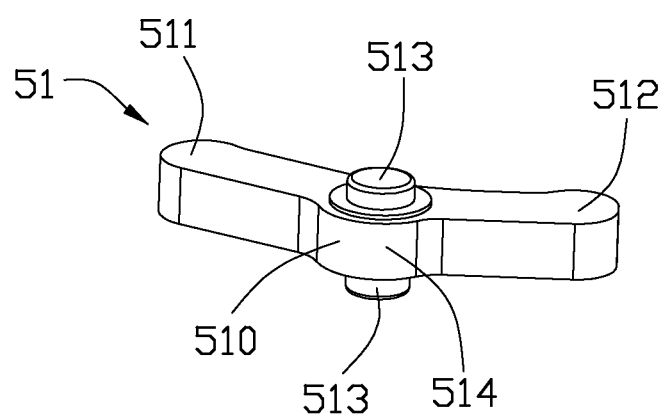
FIG. 4 is a perspective view of a cam of an ejector assembled in the card connector.

Referring to FIGS. 3 and 4, the ejector 50 comprises a cam portion 51 and a shaft 52 actuating the cam portion 51. The cam portion 51 comprises a pivot portion 510, a first arm portion 511 and a second arm portion 512 respectively and angularly extending from the pivot portion 510 in a horizontal plane in which the opposing insertion/ejection directions A and B and the opposing left/right directions C and D extend, and a pair of positioning portions 513 extending from the pivot portion 510 in the vertical direction. The positioning portions 513 are respectively received in the first hole 19 of the insulative housing 10 and the second hole 25 of the metal shell 20 such that the cam portion 51 rotates in the horizontal plane around the pivot portion 510. A connection between the first arm portion 511 and the second arm portion 512 is functioned as the pivoting portion 510. Therefore, rigid of the pivoting portion 510 is guaranteed and the pivoting portion 510 is not easily broken. Furthermore, the cam portion 51 has a smooth rear surface 514 scrubbing the rear wall 17 in the arc recess 18 such that the rear wall 17 sustains main pressure from the cam portion 51. The first hole 19 of the insulative housing 10 and the second hole 25 of the metal shell 20 are just for positioning the cam portion 51 because the insulative housing 10 and the metal shell 20 sustain small pressure from the cam portion 51 for protection to the insulative housing 10 and the metal shell 20. The shaft 52 comprises an actuating portion 521, an operating portion 522, and a connecting portion 523 connecting between the actuating portion 521 and the operating portion 522. The connecting portion 523 is moveable in the channel 16. The operating portion 523 extends out of the receiving space 60. The actuating portion 521 confronts the second arm portion 512 and is capable of driving the cam portion 51 to move around the pivot portion 510.

Figure 5:
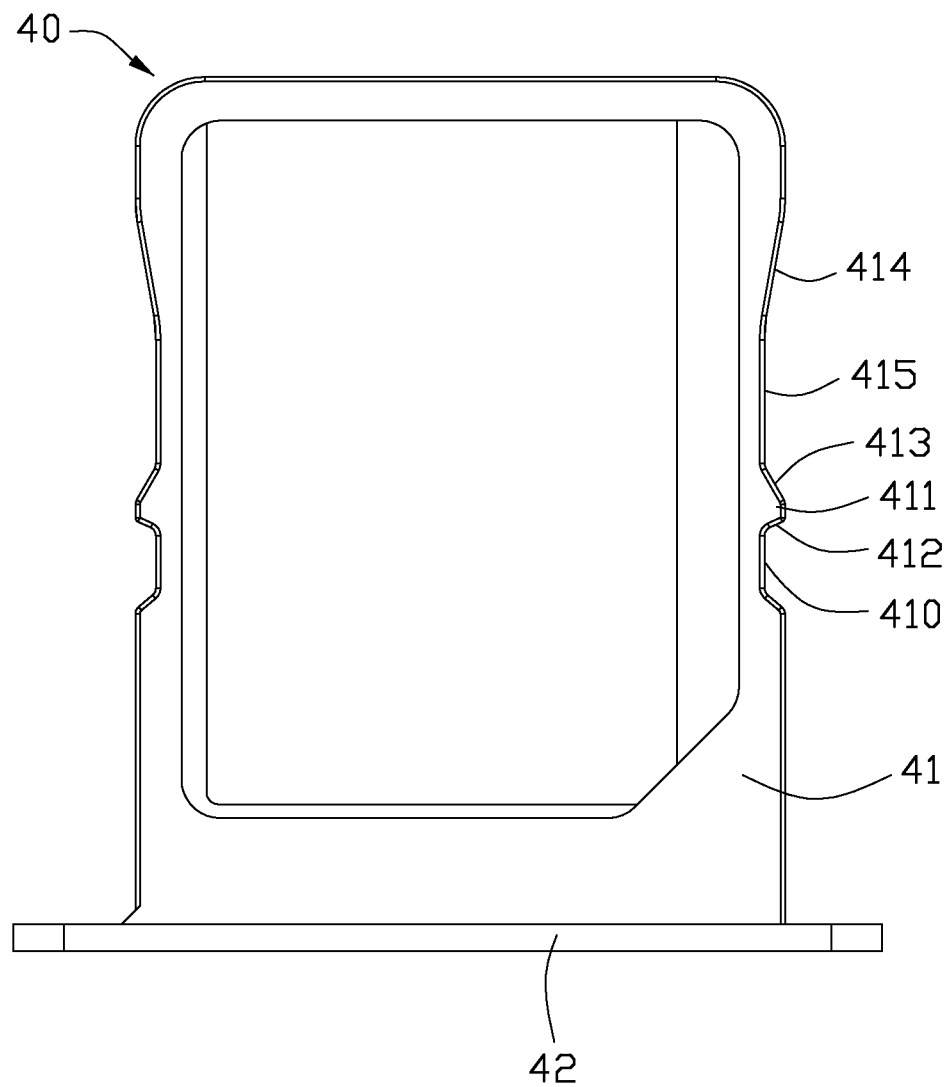
FIG. 5 is a top plan view of a tray of the card connector.
Figure 6:
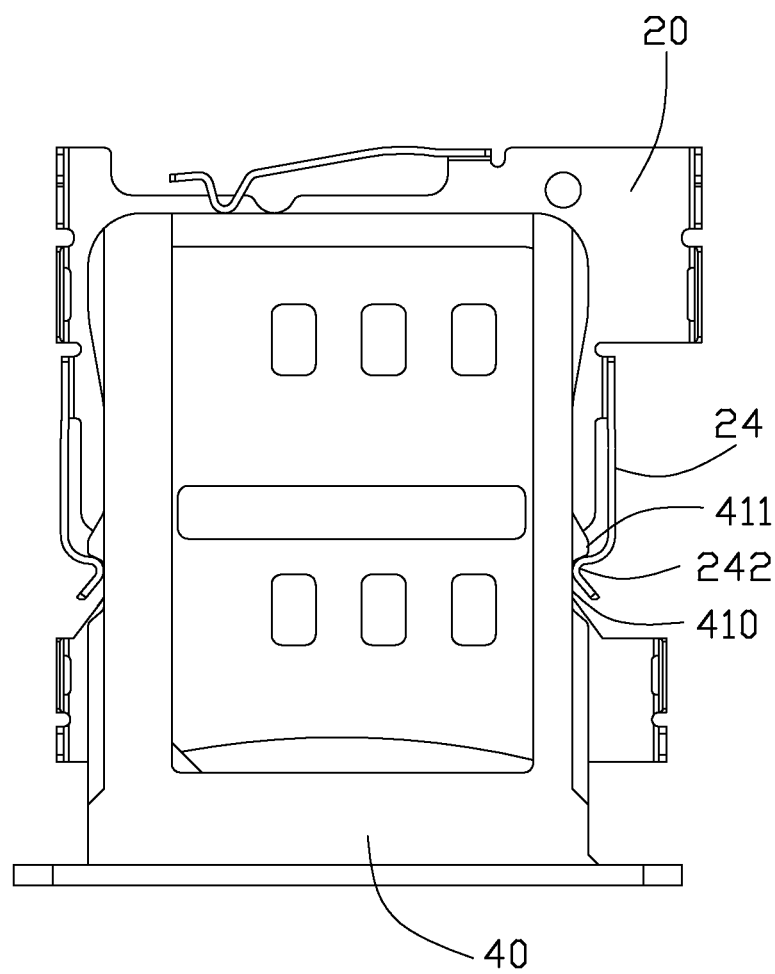
FIG. 6 is a top plan view of the card connector when the tray is fully inserted in the card connector.
Figure 7:
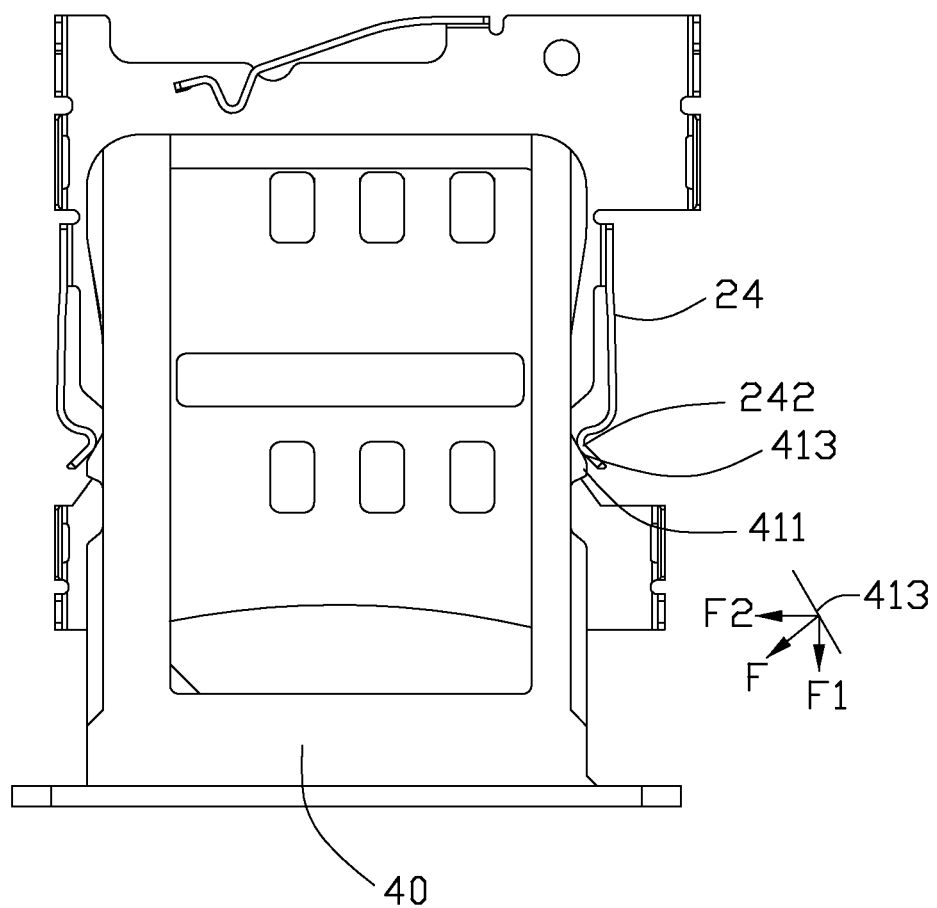
FIG. 7 is a top plan view of the card connector when the tray is initially ejected from the card connector.
Figure 8:
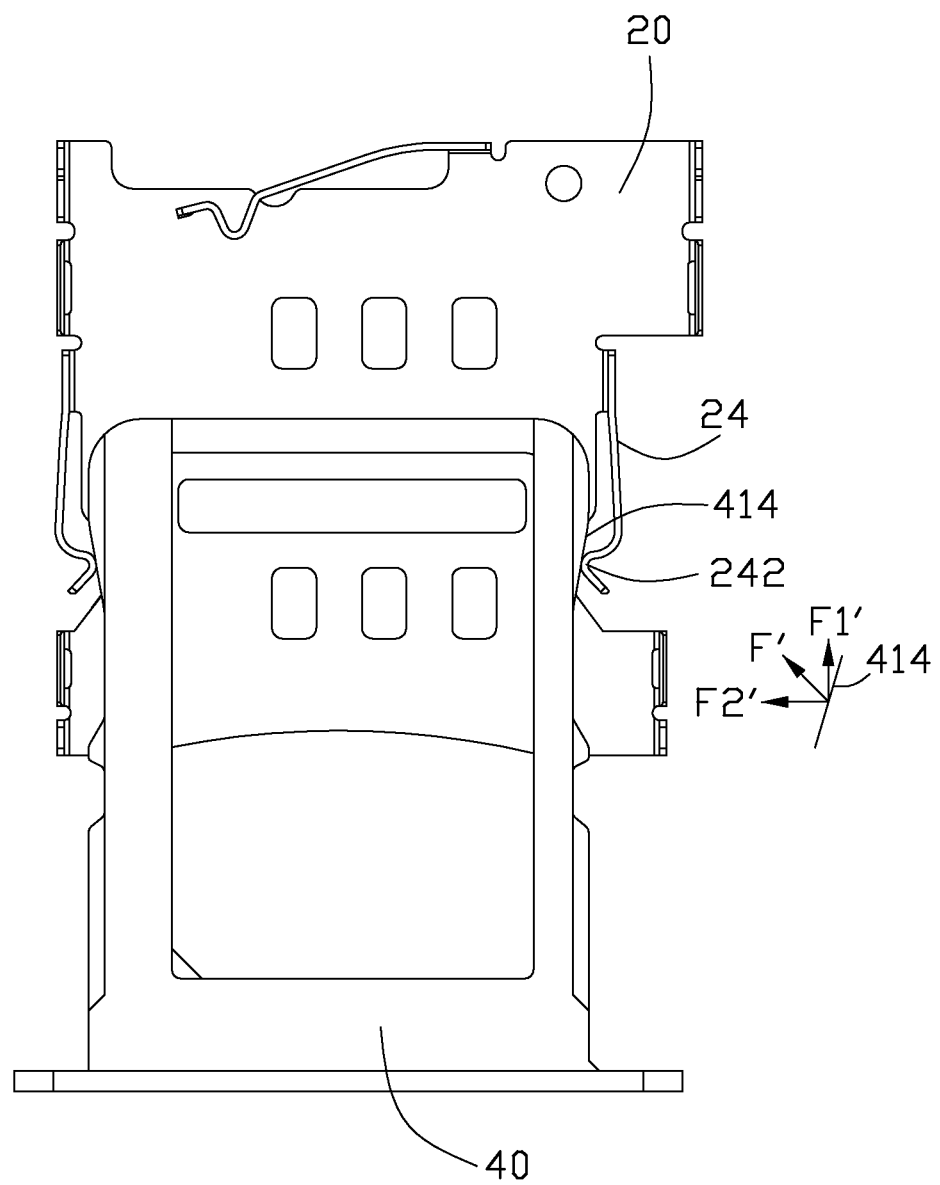
FIG. 8 is a top plan view of the card connector when the tray is about to be fully ejected from the card connector.

Referring to FIGS. 3, 5 and 6, the tray 40 comprises a frame portion 41 and a door portion 42 at frontal of the frame portion 41. The door portion 42 is integral with the frame portion 41 for increasing intension purpose in a preferred embodiment. In another embodiment, the door portion 42 is separably formed and then assembled to the frame portion 41. The door portion 43 is pre-located to fill with an insertion opening of an electronic device (not shown) on which the card connector 100 is assembled. The frame portion 41 is recessed in the middle thereof to have a card receiving room 45. The frame portion 41 defines an opening 44 below the card receiving room 45 such that the contacts 30 are capable of connecting with the electrical card through the opening 44. The frame portion 41 has two lateral edges (not labeled) and each lateral edge has a notch 410, a projecting portion 411, and a dent 415 in turn along the insertion direction A. A sharp surface 412 is defined between the notch 410 and the projecting portion 411. In a preferred embodiment, the sharp surface 412 is angled from the insertion/ejection directions A and B at 75°-90°. Therefore, a user gets a first clear feeling when the securing portion 242 of the elastic piece 24 moves from the dent 415, across the projecting portion 411, and into the notch 410. The notch 410 snaps with the securing portion 242 of the metal shell 20 when the tray 40 is fully inserted in the receiving space 60 showing as FIG. 6.

Referring to FIGS. 5-8, the tray 40 defines a slope surface 413 between the dent 415 and the projecting portion 411. In a preferred embodiment, the slope surface 413 is angled from the insertion/ejection directions A and B at 15°-45°. Particularly referring to FIG. 7, the tray 40 endures a pressure force F on each slope surface 413 when the tray 40 is initially ejected from the card connector 100. The pressure force F is split into a first component of force F1 along the card ejection direction B and a second component of force F2 along the left/right direction A/B. The second components of forces F2 are quits along the left/right direction. Therefore, the tray 40 endures two times of the first component of force (2F1) from the elastic portions 24 of the metal shell 20. The tray 40 is additionally pushed by the elastic portions 24 of the metal shell 20 when the elastic portions 242 are moved on the slope surface 413. Therefore, the tray 40 is swimmingly ejected from the receiving space 60. The user gets a second clear feeling when the securing portion 242 of the elastic piece 24 moves from the notch 410, across the projecting portion 411, and into the dent 415. Therefore, the card connector 100 provides dual feelings during both insertion and ejection of the tray 40, reminding the user that the tray 40 is fully inserted in the card connector 100 and the tray 40 begins to be ejected from the card connector 100 as well.

Referring to FIGS. 5-8, the tray 40 defines an inclined surface 414 at the other side of the dent 415 with respect to the slope surface 413. In a preferred embodiment, the inclined surface 414 is angled from the insertion/ejection directions A and B at 15°-30°. Particularly referring to FIG. 8, the tray 40 endures a pressure force F' on each inclined surface 414 when the tray 40 is about to be fully ejected from the card connector 100. The pressure force F' is split into a first component of force F1' along the card ejection direction B and a second component of force F2' along the left/right direction A/B. The second components of forces F2' are quits along the left/right direction A/B. Therefore, the tray 40 endures two times of the first component of force (2F1') from the elastic portions 24 of the metal shell 20. Therefore, the tray 40 is slowed down when the elastic portions 242 bias the inclined surfaces 414 such that the tray 40 is prevented from flying out of the card receiving space 60 showing as FIG. 8.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector comprising:
   an insulative housing;
   a plurality of contacts retained in the insulative housing;
   a metal shell attached to the insulative housing for cooperatively defining a receiving space, the metal shell comprising a pair of elastic portions; and
   a tray received in the receiving space, the tray having a frame portion having two lateral edges, each lateral edge having a notch securing with a corresponding elastic portion when the tray is fully inserted in the receiving space along an insertion/ejection direction and an inclined surface on which the elastic portions bias to slow down ejection of the tray.

2. The card connector as claimed in claim 1, wherein the inclined surface is angled from the insertion/ejection direction by 15°-30°.

3. The card connector as claimed in claim 2, wherein the tray comprises a dent spacing apart from the notch and the inclined surface is forward on one side of the dent.

4. The card connector as claimed in claim 3, wherein the tray comprises a projecting portion between the notch and the dent.

5. The card connector as claimed in claim 4, wherein the tray comprises a slope surface between the dent and the projecting portion and the slop surface faces towards the inclined surface.

6. The card connector as claimed in claim 5, wherein the slope surface is angled from the insertion/ejection direction by 15°-45°.

7. The card connector as claimed in claim 4, wherein the tray comprises a sharp surface between the notch and the projecting portion.

8. The card connector as claimed in claim 7, wherein the sharp surface is angled from the insertion/ejection direction by 75°-90°.

9. A card connector comprising:
an insulative housing defining a mating face with a tray receiving space above the mating face;
a metallic shell assemble to the housing and covering the tray receiving space;
a plurality of contacts disposed in the housing with contacting sections extending beyond the mating face;
a tray back and forth moveable in the tray receiving space in a front-to-back direction between inner locked/operation position and outer unlocked/non-operation position,
locking and retarding mechanisms being formed on two parties essentially comprised of said tray and one of the shell and the housing, said locking and retarding mechanisms including a spring tang, with a locking head around a distal end, formed on a first party of said two parties, and a front notch and a rear inclined section formed on a second party of said two parties wherein the notch is locked with the locking head for locking when the tray is located in the inner locked-operation position, and an inclined section is to gradually increase resist forces upon the locking head during outward ejecting the tray for lowering an ejection speed of the tray.

10. The card connector as claimed in claim 9, wherein the spring tang is formed on the shell, and the notch and the inclined section are formed in tray.

11. The card connector as claimed in claim 9, wherein a dent is formed between the notch and the inclined section.

12. The card connector as claimed in claim 11, wherein a projecting portion is formed between the dent and the notch.

13. The card connector as claimed in claim 11, wherein a dimension of the dent along the front-to-back direction is similar to that of the inclined section in the front-to-back direction.

14. The card connector as claimed in claim 11, wherein the spring tang is essentially in a relative relaxed manner during moving along the dent, compared with an initial stage of outward ejection of the tray where the locking head is moved to leave the notch.

15. The card connector as claimed in claim 14, wherein said dent is defined by a straight line along the front-to-back direction.

16. The card connector as claimed in claim 9, wherein said inclined section is formed along a side edge of the tray.

* * * * *